F. CARLINO.
TOMATO MASHER.
APPLICATION FILED DEC. 30, 1921.
1,418,231.
Patented May 30, 1922.
3 SHEETS—SHEET 1.
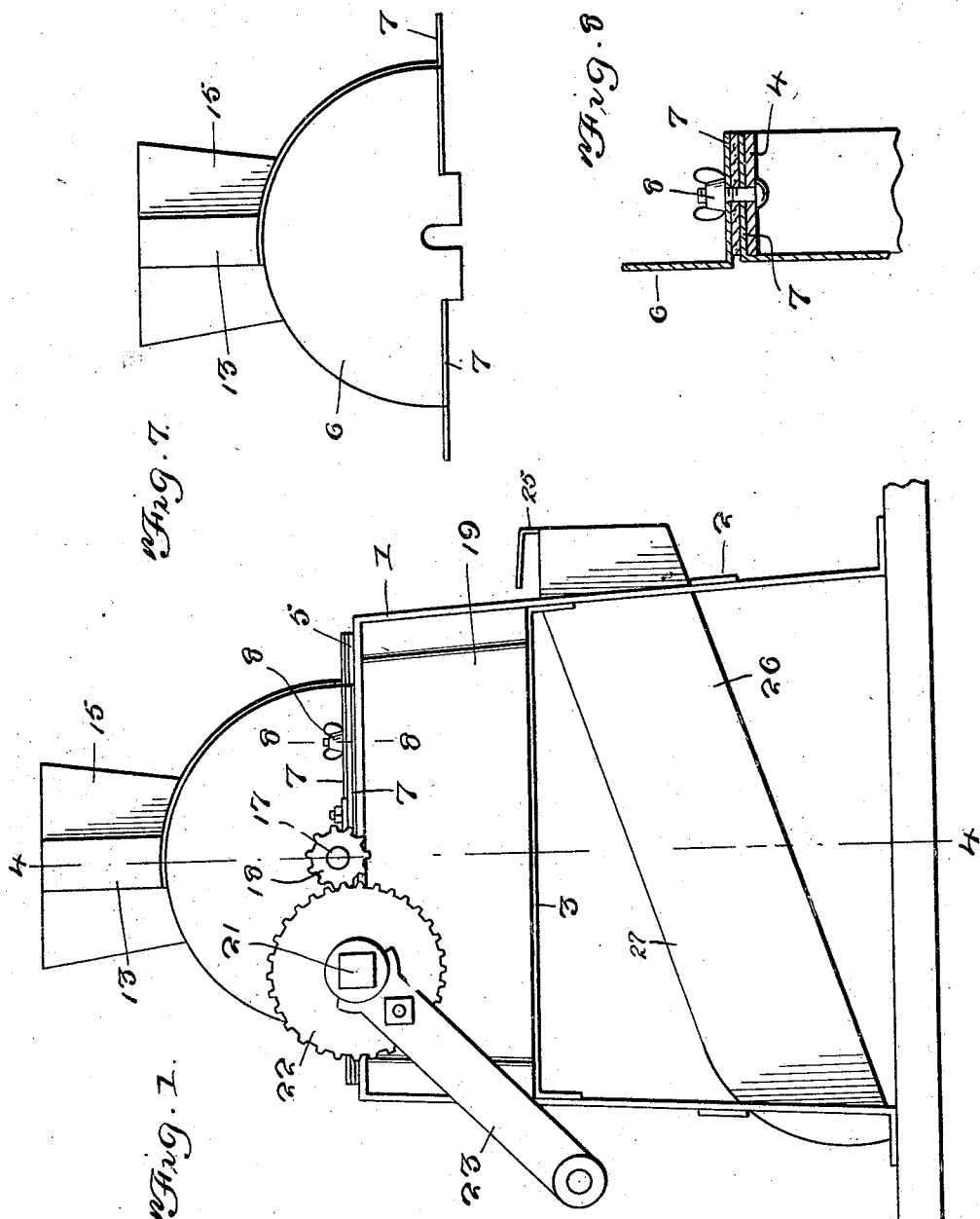
Frank Carlino, INVENTOR
BY Victor J. Evans, ATTORNEY

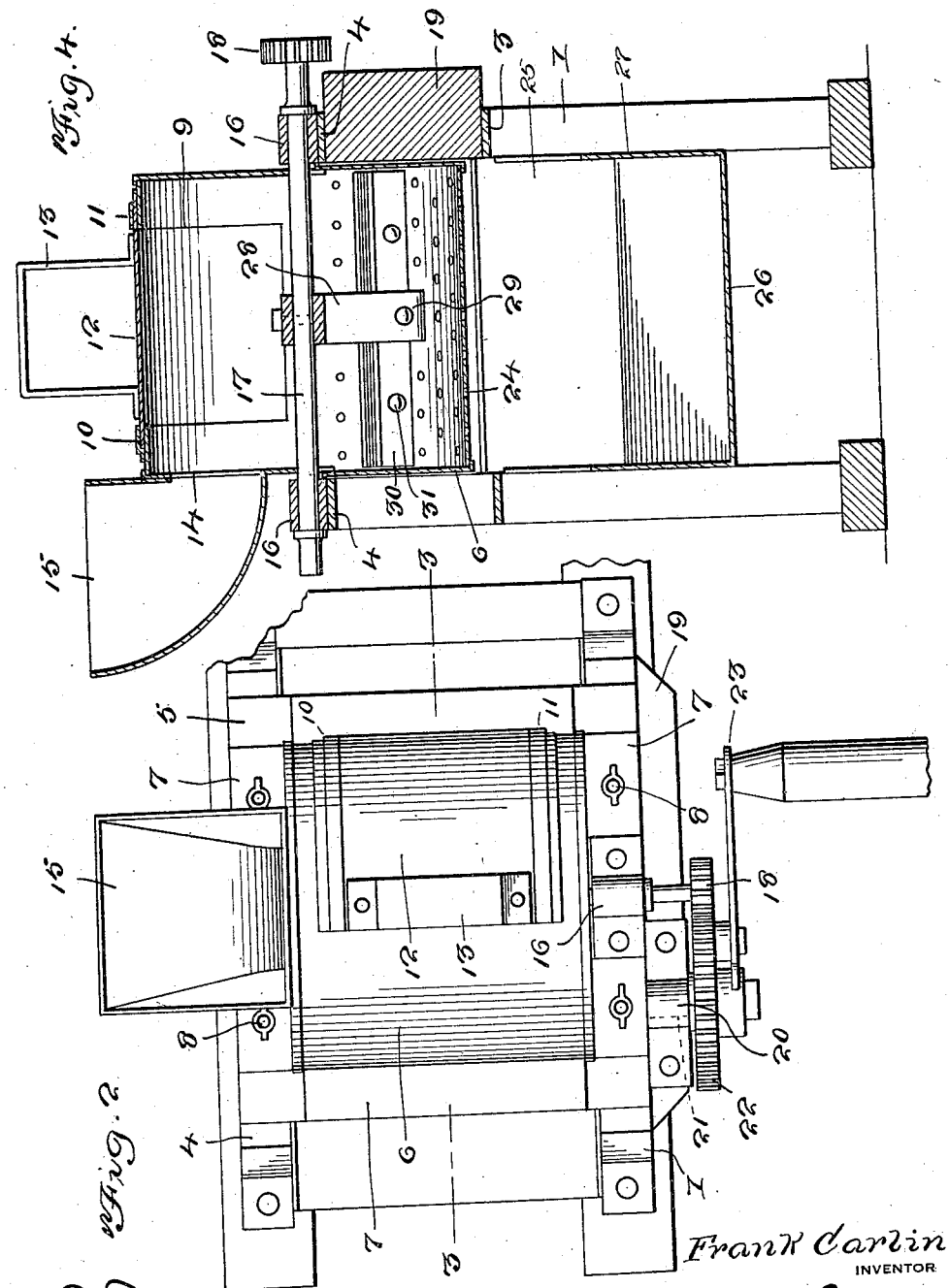

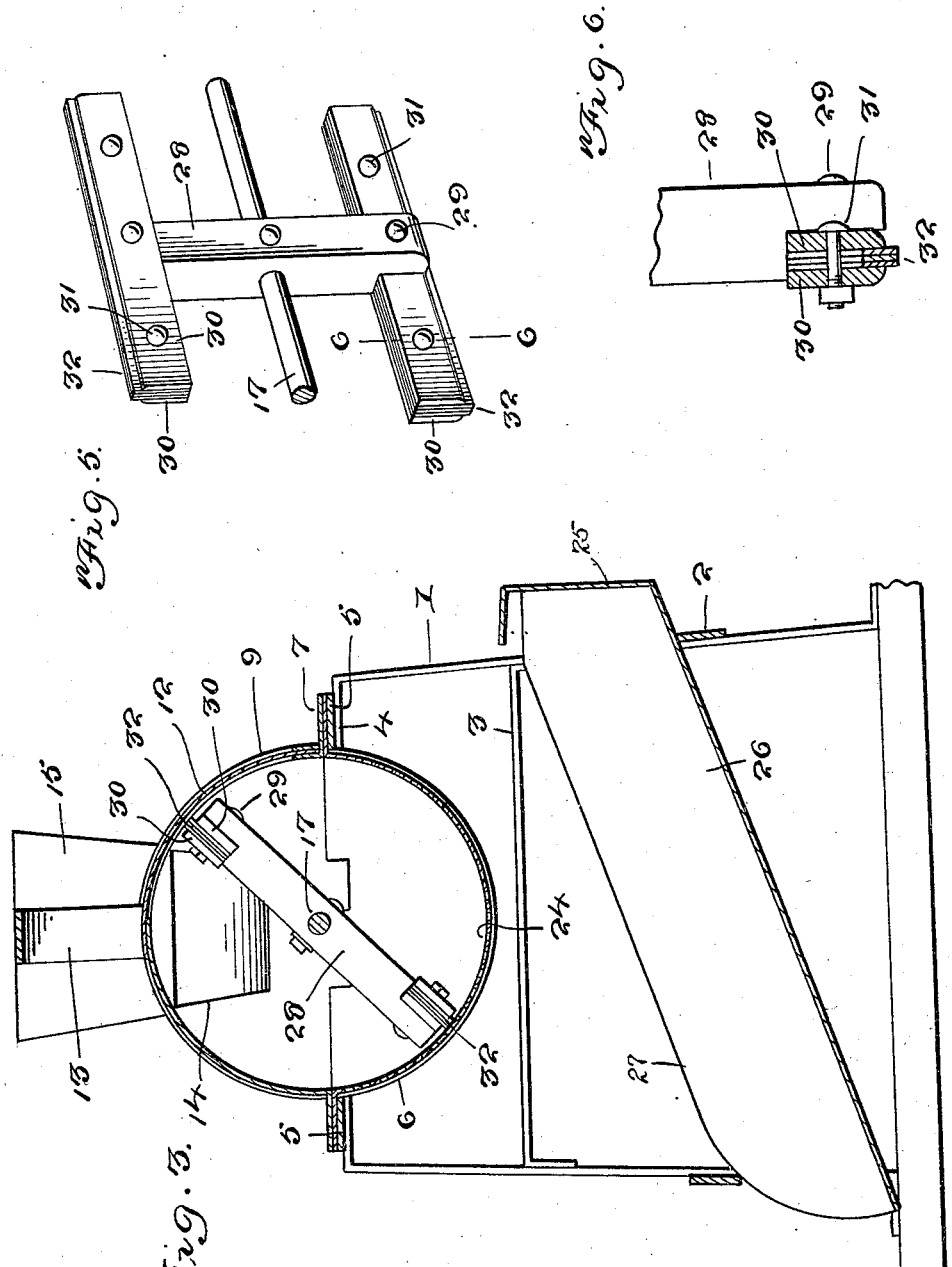

UNITED STATES PATENT OFFICE.

FRANK CARLINO, OF BUFFALO, NEW YORK.

TOMATO MASHER.

1,418,231.　　　　Specification of Letters Patent.　　Patented May 30, 1922.

Application filed December 30, 1921. Serial No. 525,846.

*To all whom it may concern:*

Be it known that I, FRANK CARLINO, residing at Buffalo, in the county of Erie and State of New York, have invented new and useful Improvements in Tomato Mashers, of which the following is a specification.

My present invention has reference to an apparatus for mashing tomatoes to separate the juice from the pulp.

In carrying out my invention, it is my purpose to produce an apparatus of this character in which tomatoes are fed through a suitable hopper into a receptacle whose lower face is apertured and which has arranged therebelow a downwardly inclined chute, while revoluble in the receptacle there is a beater member which contacts with the tomatoes fed into the receptacle to force the same against the walls of the receptacle and likewise violently contact the said tomatoes to force or squeeze all of the juices therefrom to cause the same to flow through the apertured bottom of the receptacle on to the chute and to be received in a suitable vessel provided at the mouth of the chute therefor, the said receptacle being provided with a normally closed door which, when opened, permits of the removal of the pulp therefrom.

It is also my purpose to produce a tomato masher in which a cross sectionally rounded receptacle is suitably supported on a frame, said receptacle being provided with a hopper at one side thereof and adjacent to its top which forms a means whereby tomatoes are let into the receptacle, said receptacle having its bottom apertured or reticulated and having arranged therebelow a downwardly inclined chute which is supported by the frame, while extending longitudinally through the receptacle and journaled in suitable bearings on the frame there is a shaft having one of its ends provided with a pinion which is in mesh with a gear whose shaft is also journaled in a bearing on the frame, said gear being provided with an operating handle, the shaft having secured thereto the central arm of a beater of a peculiar and novel construction and which is arranged in the receptacle to contact with the tomatoes as the same are fed thereinto in the chute to beat the said tomatoes to mash the same to force the juice thereof through the apertured or reticulated bottom of the receptacle, the said receptacle being provided with a normally closed door which when opened permits of the removal of the pulp of the mashed tomatoes therefrom.

The drawings which accompany and form part of this specification illustrate a satisfactory embodiment of the improvement reduced to practice, and wherein:—

Figure 1 is an elevation of the improvement.

Figure 2 is a top plan view thereof.

Figure 3 is a sectional view on the line 3—3 of Figure 2.

Figure 4 is a sectional view on the line 4—4 of Figure 1.

Figure 5 is a perspective view of the beater.

Figure 6 is a sectional view on the line 6—6 of Figure 5.

Figure 7 is a side elevation of the removable upper part or receptacle of the improvement.

Figure 8 is a sectional view on the line 8—8 of Figure 1.

It is, of course, to be understood that my improved tomato masher may be constructed in varying sizes and that any desired or preferred material may be employed in the construction thereof.

As disclosed by the drawings, I make use of a frame on which the receptacle and other parts of the improvement are supported. Preferably the frame is constructed of metal straps to include the spaced pairs of legs 1 at the ends of the frame, the said legs having transverse braces 2 secured thereto as well as longitudinal braces 3, and the said legs may be integrally formed with longitudinal members 4 of the frame that provide the upper connecting means for the opposed pairs of legs. The members 4, adjacent to the outer ends thereof are connected by transverse plates 5, and these plates, as well as the members 4 provide supports for a cross sectionally rounded receptacle 6. Preferably the receptacle has its sides formed with outwardly extending flanges 7, and these flanges are secured by removable means, preferably in the nature of bolts 8, to the upper members 4 of the frame. The receptacle 6 has its upper portion adjacent to one of its sides formed with an opening 9. In a line with the side walls provided by the opening 9 and with the lower wall provided by the said openings there are flanged plates 10 and 11 respectively that form guides for a cross sectionally arched slidable door 12. The door has a handle 13 thereon, whereby the same may be slid to open or closed position. The opening closed by the door provides a means whereby the pulp may be removed from the device.

One side of the receptacle 6 is provided with an opening 14, and either integrally formed with or secured to the said side there is a hopper 15 whose lower portion surrounds the opening 14. The outer lower wall of the hopper is rounded so that tomatoes delivered therein will be directed through the opening 14 into the receptacle 6.

Journaled in suitable bearings 16 on the upper member of the frame and extending centrally and longitudinally through the receptacle 6 there is a shaft 17. On one end of this shaft there is a pinion 18. At the end of the shaft provided with the pinion the frame has secured between one of its top members 4 and one of its longitudinal braces 3 a plate 19. This plate may be in the nature of a wooden block and the same carries a bearing 20 in which is journaled a stub shaft 21 that has secured on its outer end a gear 22 that is in mesh with the pinion 18. On the outer face of the gear there is secured an operating handle 23.

The rounded face of the receptacle 6, below the shaft 17 is apertured or may be constructed of reticulated material. The spaced openings in the said portion of the receptacle are indicated by the numeral 24.

Secured to one of the ends of the frame there is the closed end 25 of a chute 26. The lower wall of this chute is arranged at a downward inclination and the said lower wall rests on one of the transverse braces 2 at one end of the frame. The sides 27 of the chute may be secured to the sides of the receptacle. At the mouth of the chute there is arranged a suitable jar or other vessel not shown to receive the juice from the mashed tomatoes.

Centrally secured to the portion of the shaft arranged in the center of the receptacle 6 there is an arm 28. The ends of this arm terminate only a slight distance away from contacting engagement with the inner wall of the receptacle 6 and the said ends of the arm are preferably notched and have bolted or otherwise secured thereto by means 29 spaced plates 30 respectively. These plates are of a length only slightly less than the length of the receptacle. The plates, adjacent to their ends are connected by adjustable means 31. It should have been stated that the means 29 which secure the plates to the arm are also adjustable. Between the pairs of plates there are secured compressible strips 32. These strips are, of course, held between the plates by the means 29 and the means 31.

In operation, tomatoes are let into the receptacle through the opening 14, being, as stated, first delivered into the hopper 15. Because of the comparatively large size of the gear 22 with respect to the pinion 18, the turning of the handle 23 will revolve the shaft 17 rapidly. A tomato entering the receptacle will be first contacted by one of the masher plates 30, and partly mashed thereby before the same fully enters the receptacle. The tomatoes after being received in the receptacle will be subjected to the full force of the blows by the masher members or plates 30 and to a wiping engagement by the strips 32. This last mentioned contact will squeeze the tomatoes to force the juice therefrom and cause the said juice to flow through the openings 24 in the receptacle on to the chute 28 to be delivered therefrom into the vessel provided therefor.

It is thought that the foregoing description, when taken in connection with the drawings will render it clear to those skilled in the art to which such invention relate that tomatoes fed into the receptacle of my improved masher will be positively acted upon by the beaters therein and quickly reduced to a pulp. The pulp being acted upon by the wiper strips 32 of the beaters will be positively forced through the openings in the bottom of the receptacle so that all juice will be thus removed from the pulp. The pulp can be readily removed from the receptacle upon opening the doors 12. The improvement, it is to be noted is of a comparatively simple construction, may be cheaply manufactured, easily operated and will be found thoroughly efficient for the purpose for which it is devised. It is to be understood, however, that the improvement is not to be restricted to the details of construction herein set forth as I may, at a future date, resort to such modifications as fall within the scope of what I claim.

It is to be noted that the upper part or receptacle 6 of the improvement is detachably associated with the remainder of the construction, and that the same is centrally formed with a slot for the shaft 17. Thus by removing the winged nuts 8 the member 6, and the elements associated therewith may be disconnected from the remainder of the construction, and the removal of the said member 6 permits of the removal of the shaft 17 and the elements associated therewith.

Having described the invention, I claim:—

In a tomato masher, a frame, a cross sectionally rounded receptacle mounted thereon and having its lower rounded face reticulated, said receptacle having an opening at the top on one side thereof, guides surrounding the opening, an arched door received in the guides and normally closing the opening, a tomato delivery hopper at one side of the receptacle, a shaft extending centrally and longitudinally through the receptacle and journaled in bearings on the frame, a downwardly inclined hopper supported on the frame below the reticulated bottom of the receptacle, an arm centrally secured on the shaft, plates adjustably secured to the ends of the arm, wiper strips adjustable between the plates and in contacting engagement with the inner wall of the receptacle, and means on the frame for imparting a rotary motion to the shaft.

In testimony whereof I affix my signature.

FRANK CARLINO.